July 5, 1932.    J. C. ROWE    1,866,225

LAWN EDGE TRIMMING MACHINE

Filed July 13, 1931

Inventor
J. C. Rowe
By *[signature]*
Atty.

Patented July 5, 1932

1,866,225

UNITED STATES PATENT OFFICE

JOHN CHARLES ROWE, OF CAULFIELD, VICTORIA, AUSTRALIA

LAWN EDGE TRIMMING MACHINE

Application filed July 13, 1931, Serial No. 550,570, and in Australia September 1, 1930.

One object of this invention is to provide hand propelled machine shears for trimming edges of lawns and like vegetation, rapidly, accurately, and easily. The machine has a suitable carriage, one ground wheel being sufficient with mechanism whereby intermittent opening and closing movement is imparted to shears. A further object of the invention is to provide for adjusting the ground wheel height so that, at will, the user can vary the position of the shears relatively to the ground.

The drawing herewith illustrates the invention.

In this drawing Figure 1 is a perspective view of my machine, part of the handle being omitted.

Figure 1:
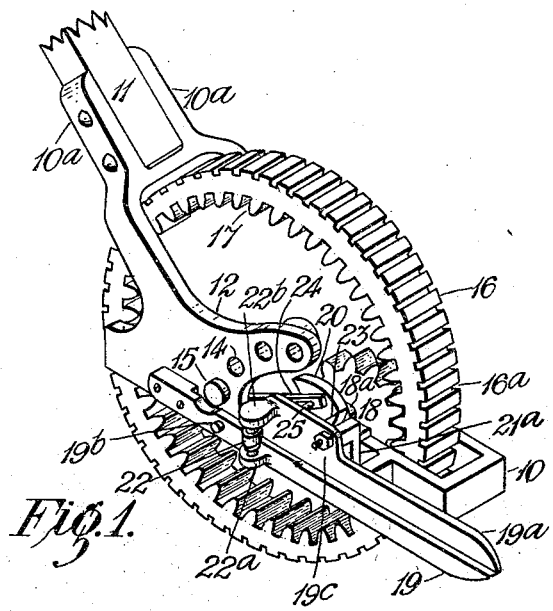

In these figures 10 indicates the carriage comprising a frame having a forked upward extension $10^a$, to which is secured a handle 11 of any desired length. This frame has cheeks 12, 13, having holes 14 any suitable pair of which supports an axle 15 of a ground wheel 16 in suitable alignment with which the handle 11 extends. These holes 14 enable the frame and the axle height above the ground to be regulated; but it is obvious that other mechanically equivalent means of effecting such regulation may be used. $16^a$ is the tread of the ground wheel.

Figure 4:
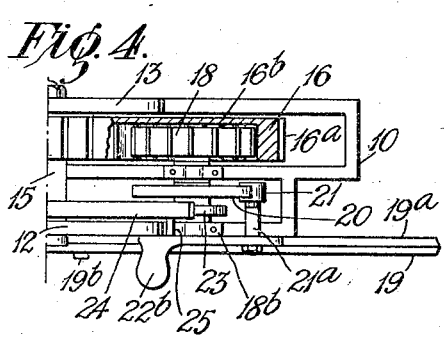
Figure 4 is a plan—partly sectional—of the forepart of the machine.

The inner periphery of the ground wheel consists of teeth 17 which mesh with a pinion 18, the axle $18^a$ of which is supported—see Figure 4—by bearings $18^b$ on frame 10, and if desired the ground wheel teeth are shrouded—to any convenient extent to exclude débris,—as at $16^b$ in Figure 4.

I use shears of which one blade 19 is fixed and the other is movable relatively thereto. The fixed blade is supported on one side of the frame; and the movable blade, $19^a$, is supported—see Figures 1 and 4, between the blade 19 and the frame, by a pivot pin $19^b$. The height of the shears above the ground—that is their working position—depends on the tilting of the parts by means of the handle and the adjustment of the frame relatively to the said axle.

Figure 2:
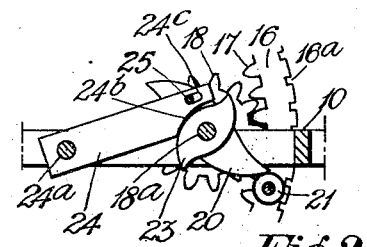
Figures 2 and 3 are diagrams showing cams, in cutting and non-cutting positions respectively.
Figure 3:
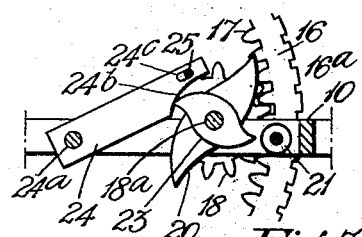

In Figures 1 to 5 the shears are shown to be cam operated, that is the pinion axle $18^a$ carries a cam member 20 having striking faces—two being shown—each of which in its revolution causes a closing of blade $19^a$ by the impact of said striking face on a projection which is shown as roller 21, in Figures 2 and 3. To support the axle of this roller an arm $21^a$—see Figures 4 and 5—extends from a part, $19^c$, of the movable blade.

Figure 5:
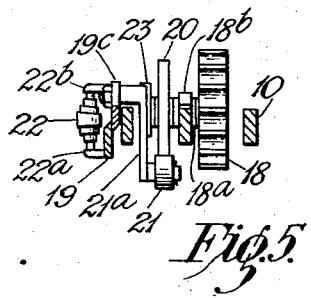
Figure 5 is an elevation in section, transversely through Figure 4.

It is advantageous to provide, to assist the blade opening, a spring or springs; and in Figure 5 a volute spring 22 is illustrated with its ends enclosing opposed pins projecting from lugs $22^a$, $22^b$ which extend from the respective blades.

On the pinion axle I provide however, another cam member 23, having the same number of striking faces as cam 20, the striking faces of cam 23 being positioned to act intermediately of those of cam 20. An arm 24—see Figures 2 to 4—is pivoted to a support $24^a$ on the frame. This arm has a face $24^b$ and when the shears are closed, a face of cam 23 bears against the face $24^b$. To transmit movement of the arm to the blade $19^a$, the arm has a slot $24^c$ which is engaged by a pin 25 projecting from the said blade.

Figures 6, 7:
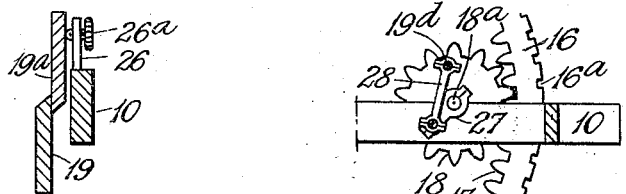
Figure 6 is a sectional elevation of a shear blade pressure device.
Figure 7 is a view of a modified blade operating mechanism.

To press the moving blade laterally towards the fixed blade I provide—see Figure 6—a lug 26 extending from frame 9, the lug carrying the pressure means shown as an adjustable screw $26^a$ which the user may set at will.

Figure 8:
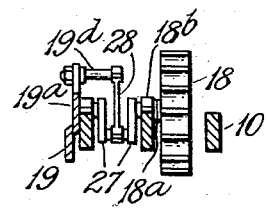
Figure 8 is an elevation in transverse section, of parts in Figure 7.

Figures 7 and 8 show, instead of the said cams, a crank 27 carried by axle $18^a$, and a connecting rod 28 extending from the crank to a pin 19ᵈ projecting from blade 19ᵃ.

Figure 9:
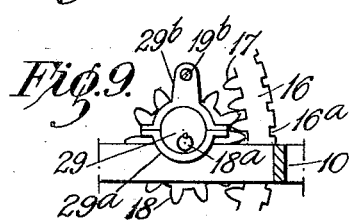
Figure 9 is a view of eccentric mechanism for blade operating.

Figure 9 shows an equivalent of what is shown by Figure 7, that is 29 is an eccentric, its strap 29ᵃ having a projecting arm 29ᵇ coupled to pin 19ᵈ—the use of a spring 22 not being preferred when the crank or eccentric is used.

To trim a lawn edge with this machine, it is pushed along with one side of its ground wheel in proper proximity to a lawn edge, for example parallel and near thereto. The advance of the wheel rotates the pinion, and thus axle 18ᵃ, causing the gearing to open and close the shears, which clip the grass or the like. While thus at work the machine can be shifted about and, if desired, tilted by the user according to his manipulation of the handle and he will thus enable the machine to travel in various directions and the shears to clip at various levels.

It is obvious that a machine of the kind stated may be equipped with free wheel devices of known detail, whereby while the machine is drawn rearwardly, the shears will remain at rest, but will open and close when the machine moves ahead.

Coverings which are usable over cam or crank mechanisms to prevent them becoming fouled by débris are well known machine elements not requiring illustration.

I claim:—

1. A lawn edge trimming machine including a frame having frame cheeks, each formed with a series of apertures, a ground wheel, an axle for the ground wheel capable of location in selected pairs of apertures to adjust the frame height relative to the ground, a fixed blade carried by the frame, a movable blade mounted on the frame, and means for actuating the movable blade with respect to the fixed blade in the turning of the ground wheel.

2. A lawn edge trimming machine including a frame having frame cheeks, each formed with a series of apertures, a ground wheel, an axle for the ground wheel capable of location in selected pairs of apertures to adjust the frame height relative to the ground, a fixed blade carried by the frame, a movable blade mounted on the frame, a cam operated in the turning of the ground wheel for closing the movable blade with respect to the fixed blade, means for opening the movable blade with respect to the fixed blade, said means including an arm pivoted to the frame and formed with a slot, a projection from the movable blade entering the slot, and a cam for cooperating with and operating the arm, said cam being driven in the movement of the ground wheel.

3. A lawn edge trimming machine including a frame, a ground wheel for the frame, means carried by the frame whereby the axle of the ground wheel may be adjusted to vary the height of the frame relative to the ground surface over which the wheel is moving, a cutter including relatively movable shear blade carried by the frame, a pinion operated by the ground wheel, a cam operated by the pinion and cooperating with the movable shear blade for opening said blades, a second cam operated by the pinion, an element carried by the frame and moved by the second cam, and a connection between said element and the movable shear blade to operate said blade relative to the fixed blades, the said cams providing intermittent opening and closing of the shear blades for cutting purposes.

In witness whereof I have hereunto signed my name to this specification at Melbourne in the State of Victoria, in Australia, this 1st day of June 1931.

JOHN CHARLES ROWE.